United States Patent [19]

Glaser et al.

[11] Patent Number: 5,459,173

[45] Date of Patent: Oct. 17, 1995

[54] STABILIZER SYSTEM FOR THIOL-ENE AND THIOL-NENE COMPOSITIONS

[75] Inventors: David M. Glaser, New Britain; Anthony F. Jacobine, Meriden; Paul J. Grabek, Deep River, all of Conn.

[73] Assignee: Loctite Corporation, Hartford, Conn.

[21] Appl. No.: 81,456

[22] Filed: Jun. 22, 1993

[51] Int. Cl.$^6$ .............................. C08K 5/08; C08K 5/13; C08K 5/17; C08G 75/04
[52] U.S. Cl. .................... 522/29; 522/30; 522/47; 522/65; 522/69; 522/180; 524/189; 524/204; 528/192; 528/215; 528/217; 528/376; 528/205
[58] Field of Search ..................... 528/192, 205, 528/215, 217, 376; 522/65, 29, 30, 47, 69; 524/189, 204

[56] References Cited

U.S. PATENT DOCUMENTS

| | | | |
|---|---|---|---|
| 3,619,393 | 11/1971 | Stahly | 204/159.15 |
| 4,097,464 | 6/1978 | Kline | 260/62 |
| 4,808,638 | 2/1989 | Steinkraus | 522/24 |
| 4,985,471 | 1/1991 | Ohta et al. | 522/27 |
| 5,034,156 | 7/1991 | Varwig | 252/403 |
| 5,034,490 | 7/1991 | Jacobine et al. | 528/30 |
| 5,208,281 | 5/1993 | Glaser | 524/189 |

OTHER PUBLICATIONS

Jacobine, et al, "Photocrosslinked Norbornene-Thiol Copolymers: Synthesis, Mechanical Properties, and Cure Studies," Journal of Applied Polymer Science, vol. 45, 471–485 (1992).

*Primary Examiner*—Susan W. Berman
*Attorney, Agent, or Firm*—Edward K. Welch, II; Eugene F. Miller; Dana M. Bosco

[57] ABSTRACT

Stable thiol-ene compositions are provided which comprise a polythiol, a polyene and a stabilizer system comprising an alkenyl substituted phenolic compound having a formula:

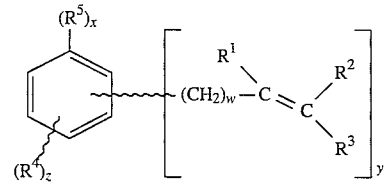

wherein $R^1$, $R^2$ and $R^3$ are independently selected from the group consisting of H, OR, a $C_1$–$C_8$ alkyl, substituted alkyl, alkenyl or substituted alkenyl, a $C_6$–$C_{20}$ aryl or substituted aryl, or a cyano group; $R^4$ is H, R, OR, halogen, COR, COOR, or SR; $R^5$ is OH, OR, OCOR, OCOOR, OCONHR, or OTMS; R is a $C_1$–$C_6$ alkyl, a cycloalkyl, or a $C_6$–$C_{20}$ caryl or substituted aryl; x and y are 1, 2, or 3; z is 0, 1, or 2; and x+y+z=2, 3, or 4; or a formula:

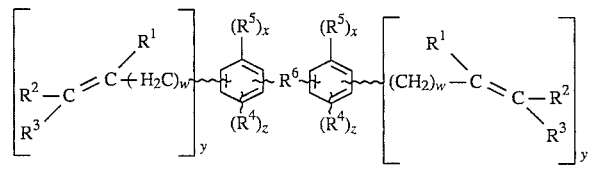

where x, y, z, w, $R^1$ $R^2$ $R^3$, $R^4$ and $R^5$ are defined as above, except that x+y+z=2–6, and $R^6$ is $CH_2$, $C(CH_3)_2$, O, S, or $SO_2$; and one or more compounds selected from the group consisting of a free radical scavenger, a hindered phenolic antioxidant and a hydroxylamine derivative.

23 Claims, 5 Drawing Sheets

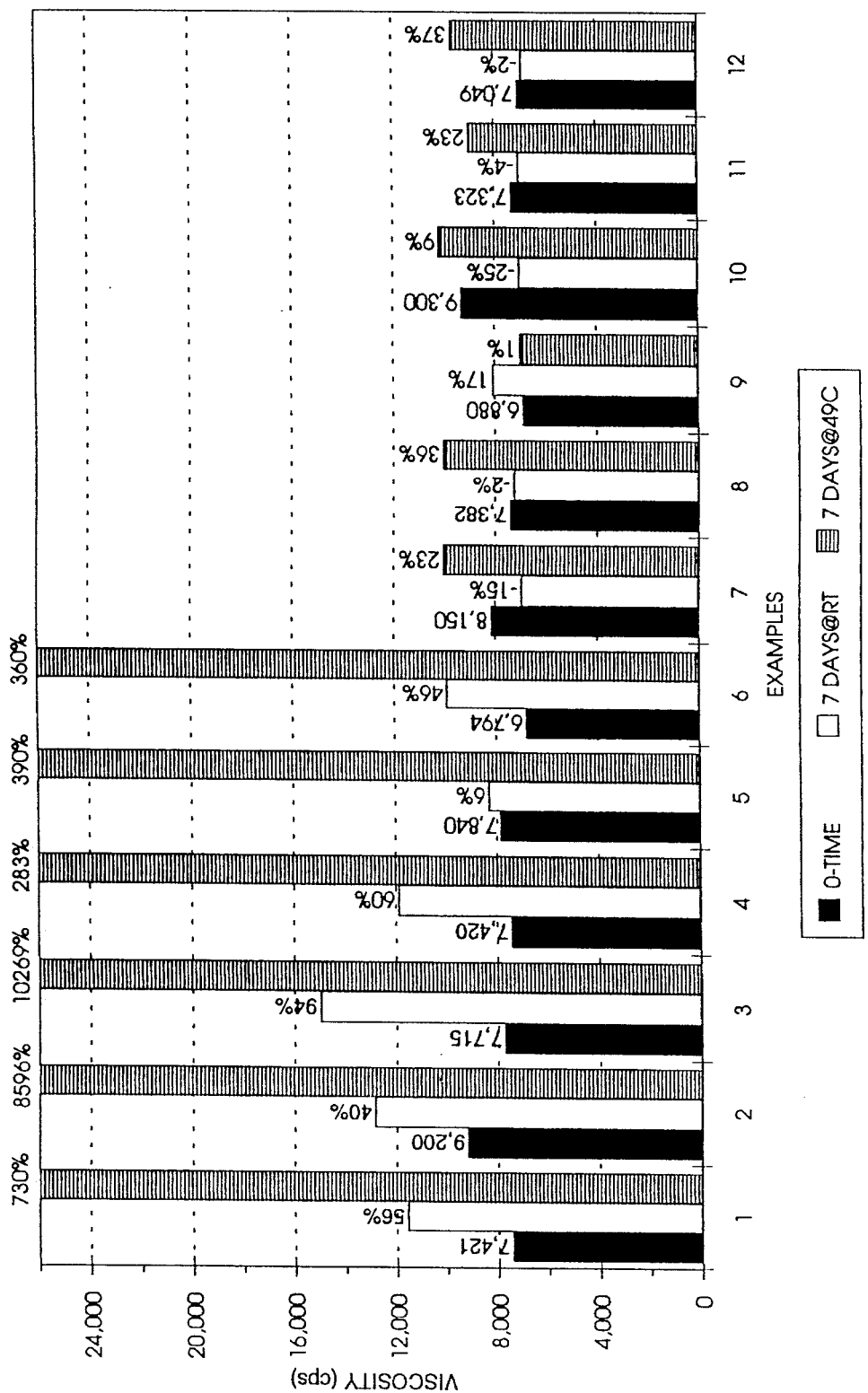

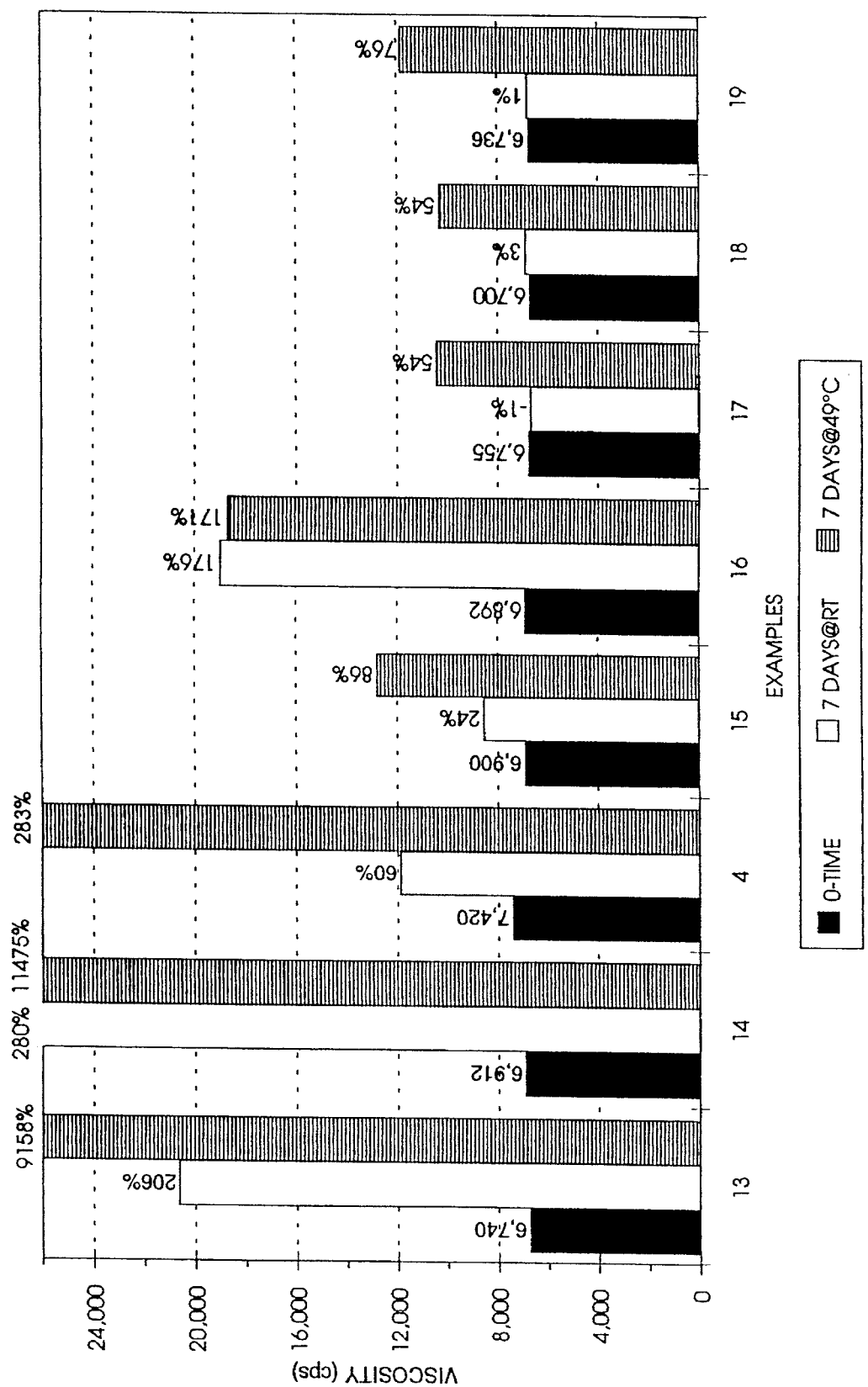

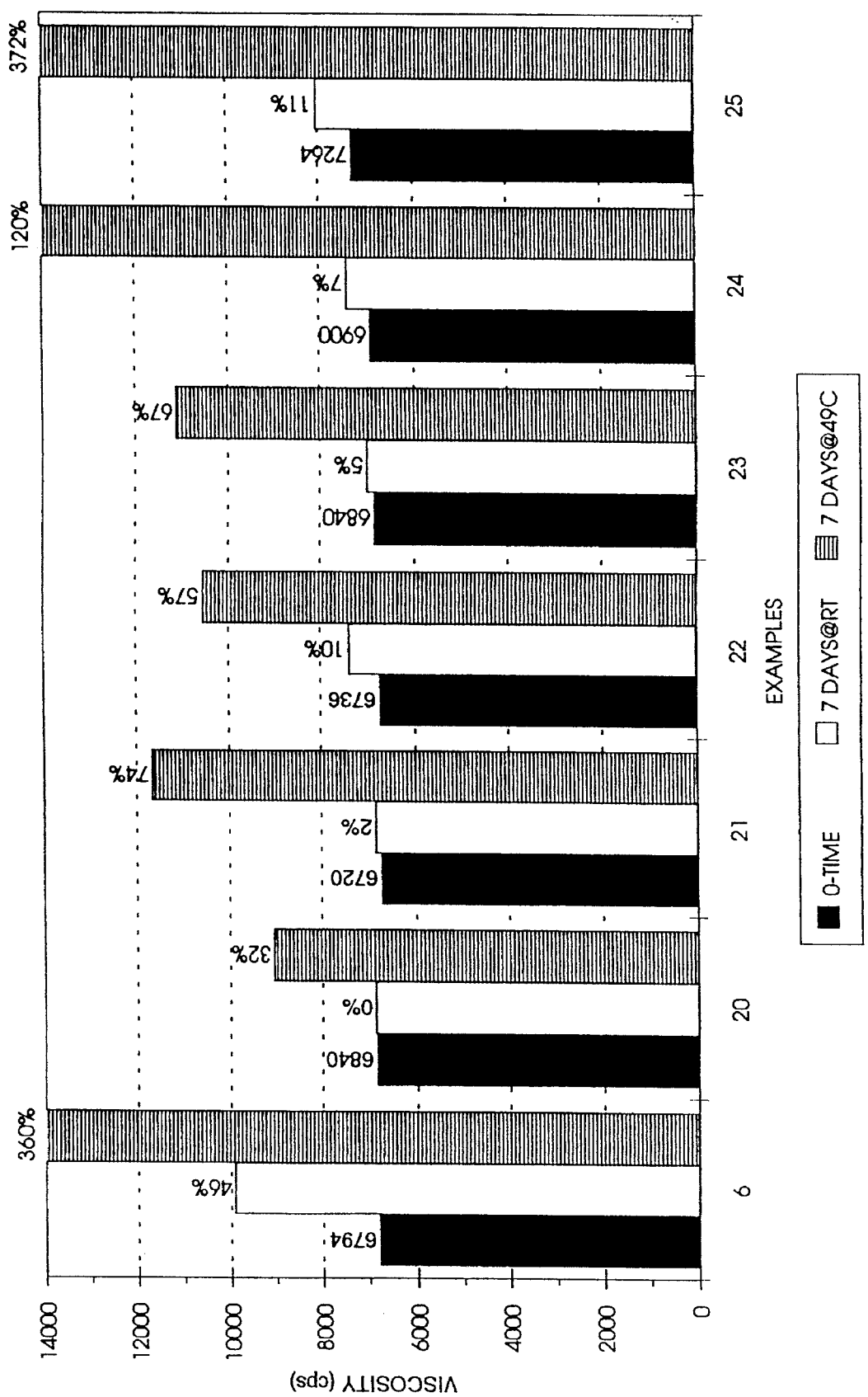

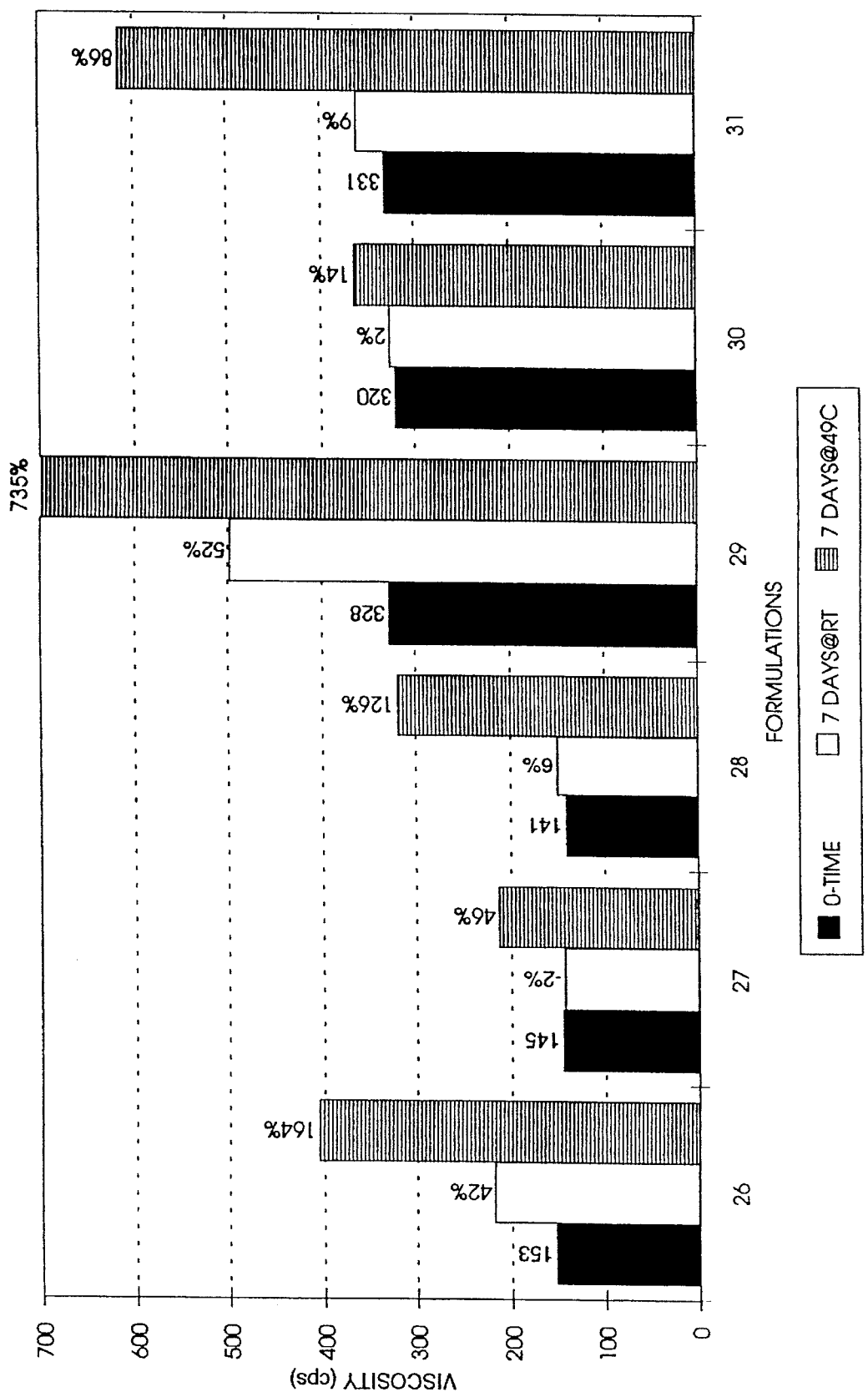

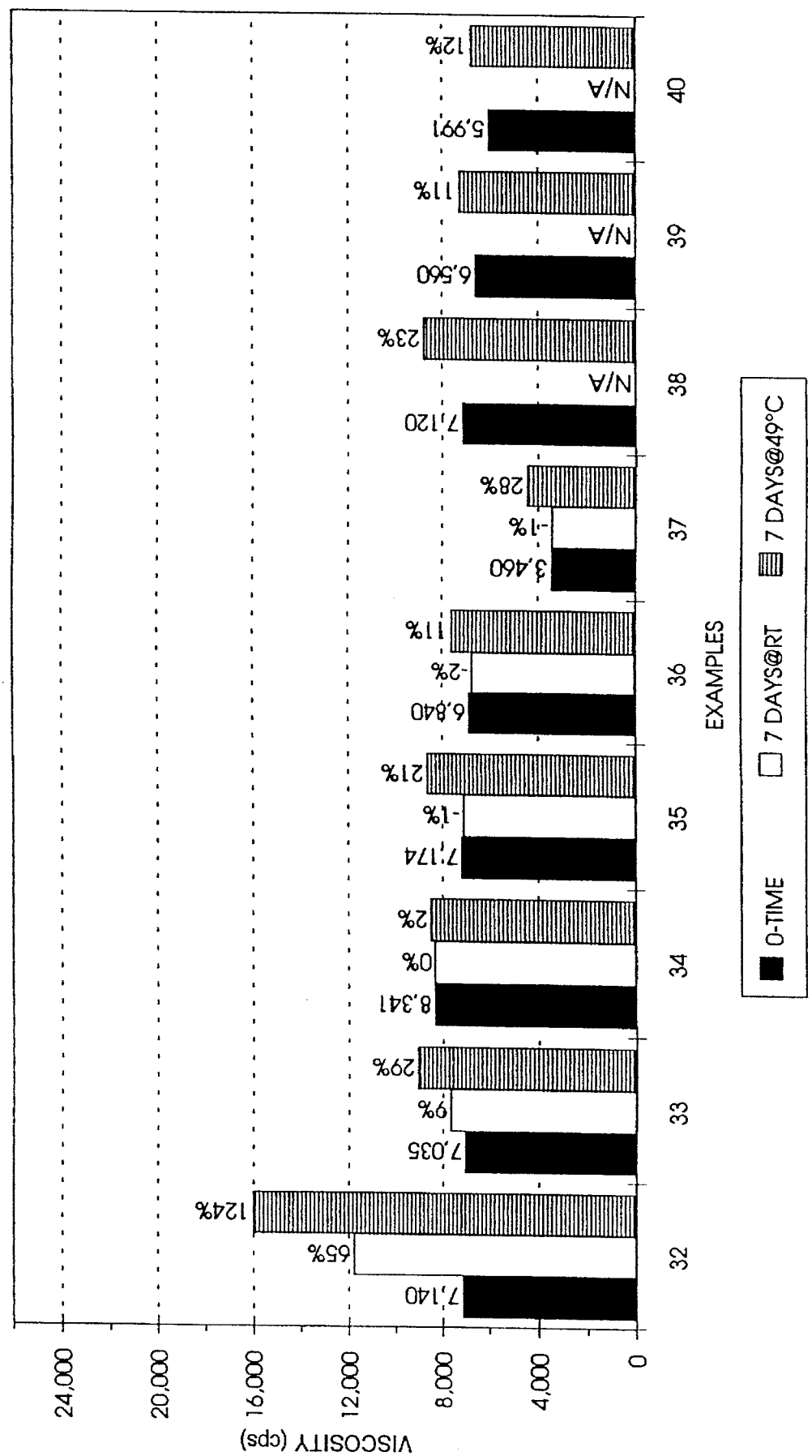

STABILIZER SYSTEM FOR THIOL-ENE AND THIOL-NENE COMPOSITIONS

BACKGROUND OF THE INVENTION

1. Field of the Invention

The present invention relates to stabilizer systems for curable thiol-ene formulations. More particularly, the invention relates to a stabilizer system comprising an alkenyl substituted phenolic compound in combination with one or more of the following compounds: a free radical scavenger, a hindered phenolic antioxidant, or a hydroxylamine derivative.

2. Description of the Related Art

The synthesis of polythioethers by crosslinking polyenes with polythiols is well-known in the art. These compositions can be cured by photopolymerization initiated by actinic radiation, in particular radiation in the UV-visible range, or by the use of high energy electron beam radiation or by exposure of the reactants to chemical free radical generating agents.

A preferred group of thiol-ene compositions are those in which the ene is a bicyclic compound such as norbornene as described in U.S. Pat. No. 4,808,638. These thiol-nene compositions are useful in a variety of applications because of their rapid photocure speeds and the wide variety of cured product profiles available to the formulator.

Though thiol-nene compositions have many advantages, it is difficult to stabilize them, especially to attain long term shelf stability. Formulations which have long term shelf stability are defined as those which do not double their viscosity in six months at room temperature. An increase in viscosity indicates that a spontaneous oligomerization reaction is occuring between the polyene and the polythiol. In extreme cases, the unstable formulations will result in intractable, insoluble gels.

Conventional stabilizers for thiol-ene formulations include hydroquinone, p-tert butyl catechol, 2,6-ditert-butyl-p-methylphenol, phenothizaine, N-phenyl-2-naphthylamine, inert gas atmospheres such as helium, argon, nitrogen, carbon dioxide and acidic stabilizers such as phosphorous acid as disclosed in U.S. Pat. No. 3,787,303. Additional stabilizers include the free radical scavenger vinyl stabilizers disclosed in U.S. Pat. No. 3,619,393 and the metal complexes of N-nitrosophenylhydroxylamine disclosed in U.S. Pat. No. 4,985,471. However, these conventional stabilizers are not effective in thiol-nene formulations. This is probably because norbornenyl groups are almost an order of magnitude more reactive with polythiols than are enes such as butyl vinyl ether as disclosed in Radiation Curing of Polymeric Materials, Hoyle & Kinstle eds., ACS Symposium Series 417, pgs 165–167.

Several references have proposed stabilizers specifically for thiol-nene formulations. For example, EPO Application No. 0428342A discloses that certain N-nitrosohydroxyl amines and salts thereof function as stabilizers for radically curable norbornenyl-thiol formulations. While this provides a marked improvement over conventional stabilizers and allows for the production of commercially acceptable short-term stable products, it does not provide consistent and sufficient long-term stability necessary for the formulations to have a broad commercially acceptable shelf life and also is very sensitive to trace impurities in the nene resin. U.S. Pat. No. 5,208,281 discloses a stabilization system for thiol-nene formulations comprising N-nitrosoarylhydroxylamine and an active iodine species. While this stabilizer system provides a better stability than conventional stabilizers and is also less sensitive to trace impurities in the nene resin, it does not provide the desired long-term stability.

Therefore, there is still a need for an improved stabilizer system for thiol-ene and particularly thiol-norbornenyl (thiol-nene) formulations which provides long-term shelf stability without significantly adversely impacting cure speed.

BRIEF SUMMARY OF THE INVENTION

The present invention provides curable stable thiol-ene and thiol-nene compositions comprising a thiol component, an ene or nene component, respectively, and a stabilizer system comprising an alkenyl substituted phenolic compound and one or more of the following compounds: a free radical scavenger, a hindered phenolic antioxidant and a hydroxylamine derivative.

Another aspect of the present invention provides a method for producing stable thiol-ene and thiol-nene compositions comprising the steps of adding a stabilizer system to the thiol-ene or thiol-nene composition, the system comprising an alkenyl substituted phenolic compound and one or more of the following compounds: a radical scavenger, a hindered phenolic antioxidant and a hydroxylamine derivative.

Other advantages of the present invention will be better appreciated from a detailed description thereof which follows.

DETAILED DESCRIPTION OF THE PREFERRED EMBODIMENTS

The present invention provides thiol-ene and especially thiol-nene compositions that are stable at ambient temperatures and show improved stability at elevated temperatures. The stabilizer system employed comprises an alkenyl substituted phenolic compound with one or more of the following compounds: a free radical scavenger, a hindered phenolic antioxidant and a hydroxylamine derivative. The combination of these compounds displays a surprising synergistic effect, providing a stabilization which is more than the sum of the stabilization effect of the individual components of the stabilization system.

The alkenyl substituted phenolic compound of the present invention may be any compound having the formula or any compound which during or subsequent to formulation of the thiol-ene or thiol-nene compound, forms in situ by molecular rearrangement, molecular cleavage, etc., a compound having the formula:

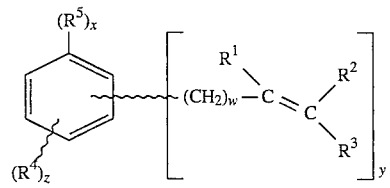

where $R^1$, $R^2$ and $R^3$ are independently selected from the group consisting of H, OR, a $C_1$–$C_8$ alkyl, substituted alkyl, alkenyl or substituted alkenyl, a $C_6$–$C_{20}$ aryl or substituted aryl, or a cyano group;

$R^4$ is H, R, OR, halogen, COR (ketone), COOR (ester), or S-R;

$R^5$ is OH, OR, OCOR (ester), OCOOR (carbonate), OCONHR (urethane), or trimethylsilyloxy (OTMS);

R is a $C_1$–$C_6$ alkyl, a cycloalkyl, or a $C_6$–$C_{20}$ aryl or substituted aryl;

Z is 0, 1, or 2;

X is 1, 2, or 3;

Y is 1, 2, or 3 such that X+Y+Z=2, 3, or 4; and

W is 0 or 1;

or the formula:

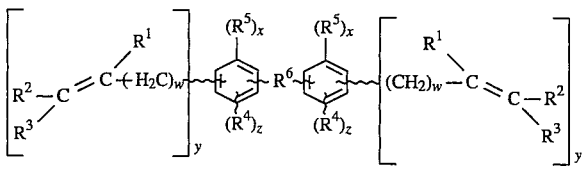

where x, y, z, w, $R^1$, $R^2$, $R^3$, $R^4$ and $R^5$ are defined as above, except that x+y+z=2–6, and $R^6$ is $CH_2$, $C(CH_3)_2$, O, S or $SO_2$. These formulas are hereinafter referred to as Formula 1 and Formula 2 respectively. Typical substituent species for the substituted alkyl, aryl, etc., include halogen atoms (e.g., chlorine and fluorine) or oxygen atoms or refers to such moieties which are interrupted by an ether oxygen atom.

Suitable compounds of Formulas 1 and 2 include 2-propenylphenol, 2-allylphenol, isoeugenol, 2-ethoxy-5-propenylphenol, 2-ally-4- methyl-6-tert-butylphenol, 2-propenyl-4-methyl-6-tert-butylphenol, 2-ally-4,6-di -tert-butyl phenol, 2-propenyl-4,6-tert-butylphenol, 2,2'diallyl-Bisphenol A and 4-acetoxystyrene. The preferred alkenyl substituted phenolic compounds can be represented by Formula 1 where w is O and there is a double bond in conjugation with the phenolic ring. The especially preferred compounds are 2-propenylphenol and 4-acetoxystyrene. The most preferred compound is 2-propenylphenol.

The free radical scavenger compound of the stabilizer system can be any member of the quinone family such as 4-methoxy phenol (MEHQ), hydroquinone (HQ), monoalkyl ethers of hydroquinone, benzoquinone, napthoquinone and other scavenger compounds known in the art. The preferred free radical scavenger is MEHQ.

The hindered phenolic antioxidants employable in the stabilizer system of the present invention are 2,6-di-tert-butyl-4-methylphenol (BHT), butylated hydroxy anisole (BHA), and other hindered phenolic antioxidants commonly known in the art which are disclosed in "Anti-oxidants, Recent Developments," M. W. Ranney, Noyes Data Corporation, 1979, pgs. 5–25, and "Atmospheric Oxidation and Antioxidants," G. Scott, Elsevier Publishing Co., 1965, pg. 297. Illustrative examples of which include esters of 3,5-dialkyl-4-hydroxyphenylalkanoic acid, bisphenolic polymers such as 4,4'-butylidene-bis(6-tert-butyl-m-cresol) and 4,4'-thiobis(6-tert-butyl-m-cresol) and oligomeric bisphenol derivatives. The preferred antioxidant is BHT.

The hydroxylamine derivatives that can be used include arylhydroxylamines such as phenylhydroxylamine, arylalkylhydroxylamines such as phenylmethylhydroxylamine, dialkylhydroxlyamine such as diethylhydroxylamine and cation salts of N-nitrosoarylhydroxylamine such as as the ammonium, sodium, potassium, magnesium, strontium, aluminum, copper, zinc, cerium, iron, nickel, and cobalt salts or combinations thereof. The preferred hydroxylamine derivatives are N-Nitrosophenylhydroxylamine aluminum salt (commercially available as Q1301 from WAKO Industries) and N-Nitrosophenylhydroxylamine ammonium salt (commercially available as Q1300 from WAKO Industries).

The preferred stabilizer system of the present invention comprises 2-propenylphenol, MEHQ and Q1301.

Generally the stabilizer system should be employed in an amount between about 0.03 to 4.1% by weight or 260 ppm to 40,500 ppm. Preferably, the stabilizer system is employed in an amount between about 0.06 to 1.1% by weight or 625 to 10,100 ppm. However, the amount employed is dependent on the type of thiol-ene formulation being used and the number and nature of the components of the desired stabilizer system. If too much of the stabilizer system is employed, cure speed of the formulation will be sacrificed without a significant commensurate increase in stability and if too little is employed the desired long-term stability will not be obtained. One skilled in the art through simple experimentation and the teachings disclosed herein will be able to determine the optimum amount of the stabilizer system to use.

Within the stabilizer system, the individual components can be present in varying amounts. However, generally the stoichiometric ratios of the components are about 1:1:1:10 of hydroxylamine derivative: free radical scavenger: hindered phenolic antioxidant: alkenyl substituted phenolic compound. More specifically, the phenolic compounds of Formula 1 can be employed in an amount between about 200 to 15,000 ppm and preferably between about 500 to 7,000 ppm. The free radical scavenger and hindered phenolic antioxidant can be employed in amounts between about 50 to 10,000 ppm and preferably between about 100 to 1000 ppm. The hydroxylamine derivatives can be employed in an amount between about 10 to 5000 ppm and preferably between about 25 to 1000 ppm.

Extensive examples of polyenes useful in the thiol-ene and thiol-nene compositions of the present invention are provided in U.S. Pat. Nos. 3,661,744, 4,119,617, 4,157,421, 4,808,638 and 5,021,512. The preferred polyenes are those compounds which contain a plurality of norbornenyl, vinyl or allylic groups.

Examples of norbornene functional compounds may be found in U.S. Pat. Nos. 4,808,638, 5,034,490, 5,167,882 and in copending U.S. application Ser. No. 07/619,068, filed Nov. 28, 1990, all incorporated herein by reference. Preferred norbornenyl compounds are those which include groups of the formula:

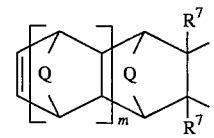

where Q is $CH_2$, $CHCH_3$, $C(CH_3)_2$, O, S, $NR^7$ or $SO_2$; $R^7$ is H or alkyl; and m is 0–10. These monomers are described in U.S. Pat. No. 4,808,638 (which is incorporated herein by reference); Jacobine, et al., J. Appl. Poly. Sci., 1992, 45, 471–485; and the copending, cofiled application of Jacobine, et al. entitled "Optical Fiber Primary Coatings and Fibers Coated Therewith." Suitable backbones for the nene-compound include hydrocarbon and heterohydrocarbon mers, oligomers, and polymers. Illustrative backbones for these nene components include polyethers, polyurethanes, polyesters and expoxy type derivatives.

Additionally, stable norbornenyl compounds include polysiloxanes having a plurality of nene functional groups having the formula:

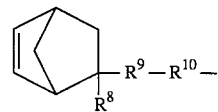

bound to the silicone resin thereof, where $R^8$ is an alkyl group, $R^9$ is a direct bond or —C(=O)O—, and $R^{10}$ is any divalent alkylene or alkenylene. These monomers are described in U.S. Pat. Nos. 5,034,490 and 5,171,816, which are incorporated herein by reference.

Mixtures of two or more polyene monomers may be used. For instance, mixtures of norbornenyl monomers, of vinyl ether monomers, of allylic monomers, of norbornenyl and vinyl ether monomers, etc., may be employed. One skilled in the art through other teachings in the art and simple experimentation will be able to determine what mixture to employ depending on the properties desired for the composition.

The polythiol component of the inventive compositions may be any compound having two or more thiol groups per molecule. Suitable polythiols are described in U.S. Pat. No. 3,661,744 at Column 8, line 76, through Column 9, line 46; U.S. Pat. No. 4,119,617 at Column 7, lines 40–57; U.S. Pat. Nos. 4,445,419; 4,289,867; and 4,808,638. Preferred polythiols are obtained by esterification of a polyol with an αor β mercaptocarboxylic acid such as thioglycolic acid or β-mercaptopropionate acid. Particularly preferred polythiols are pentaerythritol tetramercaptoacetate, trimethylolproane βtri(3-mercaptopropionate) and pentaerythritol tetrakis-β-mercaptopropionate (PETMP).

The ratio of the polyene to the polythiol component can be varied widely. Generally, it is preferred that the ratio of thiol to ene groups be between 0.7:1 and 1.3:1, more preferably about 1:1. However, ratios outside this range may occasionally be usefully employed without departing from the invention.

While curable compositions using compounds of the invention may include both difunctional ene and difunctional thiol compounds, it will be understood that at least a portion of at least one of these components should contain more than two functional groups per molecule to produce a crosslinked product when cured. That is, the total of the average number of coreactive ene groups per molecule of polyene and the average number of coreactive thiol groups per molecule of the polythiol should be greater than 4 when a crosslinked cured product is desired. This total is referred to as the "total reactive functionality" of the composition.

The polyene component may be purified by contacting it with an amphoteric treating agent selected from the the group consisting of silicated magnesium oxide, basic aluminum oxide, silica gel, magnesium oxide, magnesium hydroxide, calcium oxide, calcium, hydroxide, barium oxide and barium hydroxide and then separating the resin from the treating agent prior to mixing the polyene with the polythiol. This purification process is described in copending U.S. application Ser. No. 08/056,128, by David. M. Glaser, Anthony F. Jacobine and Paul J. Grabek, filed Apr. 30, 1993, and significantly improves the shelf life of the thiol-ene formulation. The polythiol component can also be treated in a similar manner to provide even more stability for the formulations. Further description of the treatment of the polythiol component may be found in cofiled and copending U.S. application Ser. No. 08/081,078, now U.S. Pat. No. 5,371,181, entitled "Thiol-ene Compositions with Improved Cure Speed", by David M. Glaser, Anthony F. Jacobine and Paul J. Grabek, filed on Jun. 22, 1993.

A free radical initiator is recommended in the curable thiolene formulations, suitably a free radical photoinitiator or thermal initiator. Examples of free radical photoinitiators include acyl phosphine oxides, benzoin and substituted benzoin compounds, benzophenone, Michler's Ketone, dialkoxybenzophenones, dialkoxyacetophenones, and peroxyesters described in U.S. Pat. Nos. 4,616,826 and 4,604, 295. The photoinitiator is employed in an amount effective for initiating cure of the formulation, typically 0.1–10%. Thermal free radical initiators such as peroxy compounds, azonitriles and the like, may also be used at conventional levels as initiators of the thiol-ene addition reaction.

The compositions of the invention may also include, as required, ingredients such as antioxidants, dyes, activators, another prepolymer or polymer, solvent, filler, diluent, pigment, thixotropic agent, surface active agents, adhesion promoters, and the like. However, the compositions will preferably constitute at least 50% and up to 99% by weight of polymerizable material.

Generally to prepare the inventive compositions, the solid stabilizers are mixed with one or more of the photoinitator component, the thiol component or the nene or ene component depending on the solubility of the stabilizers present. The stabilizers must be thoroughly dissolved in whichever component is used. In the situation where the free radical scavenger and hindered phenolic antioxidant components are to be dissolved in the nene resin, the mixture should be warmed to between about 40°–80° C. till the solid is completely dissolved.

Then the photoinitiator and the thiol are mixed together for a sufficient time to obtain a homogenous mixture. This generally takes about an hour. Then the ene or nene resin is added and vigorously mixed for 1 to 2 hours. The additives may be added with the ene or nene resin or just after addition of the resin. The entire process is carried out under a nitrogen atmosphere, at room temperature and actinic radiation is excluded.

The invention may be illustrated by the following non-limiting examples.

EXAMPLES

Preparation of Ethoxylated Bisphenol A Dinorbornenecarboxylate (EBPA-DN)

A 100 gallon reactor was purged with nitrogen, charged with 122.7 kg. of Ethoxylated bisphenol A diacrylate (Sartomer®, lot HXI-136g, Sartomer Company, West Chester, Pa.), a mixture of 144.5 grams of sodium thiosulfate pentahydrate in 178 grams of water, and a mixture of 16.1 grams of tetrasodium salt of ethylenediamine tetraacetic acid, 129 grams of water, and 137 grams of methanol, and stirred. The reaction mix was then stirred under nitrogen and warmed to 55° C. Freshly cracked and distilled cyclopentadiene monomer was added in increments (5–10% of the total charged at a time) so that the reactor temperature did not exceed 70° C. When all the cyclopentadiene monomer had been added, the reaction mixture was sampled. HPLC analysis (60% acetonitrile 40% water, with a gradient elution slope of 9 using a Waters Associates pump system, a C18 column, Baxter Scientific, Bedford, Mass., UV detector set at 254 nm) was carried out to determine the extent of reaction. When the reaction was judged complete by low levels of mononorbornene ester, the reactor was heated to 90° C. and vacuum was applied to remove excess cyclopentadiene monomer by distillation.

The reactor was then charged with 3.26 kg. of Magnesol® Polysorb 30/40 Clay and stirred for four hours at 70° C. The reactor was then charged with 1.63 kg. of Celite® 503 Diatomaecous Earth and stirred for one hour before filtration through a heated (70° C.) precoated filter under nitrogen pressure. The filtered and stripped crude product was collected in polyethylene lined steel drums. The crude product was then passed through a six inch vertical wiped film evaporator (130° C. at 0.1 mm Hg) to remove all volatile components and yield the finished product as a viscous amber colored resin.

This purified EBPA-DN formulation was used in the examples below.

EXAMPLE 1

Thiol-nene Formulation 1 was prepared by mixing 0.0260 grams N-nitrosophenylhydroxylamine aluminum salt (Q1301) in 1.30 grams 2-hydroxy-2-methyl-1-phenyl-propan-1-one (Darocur 1173) until all the solids were completely dissolved. 17.34 grams of Pentaerythritol tetra (3-mercaptopropionate) (PETMP) was then added and mixed for 30 to 60 minutes. Then 47.66 grams ethoxylated bisphenol A di(norborn-2-ene-5-carboxylate) (EBPA-DN) was added and the formulation mixed together for 1–2 hours. The whole process was carried out excluding actinic radiation and under a nitrogen atmosphere.

EXAMPLE 2

Thiol-nene Formulation 2 was prepared by mixing 17.34 grams of PETMP and 1.30 grams of Darocur 1173, for thirty minutes then adding 47.70 grams of a premix consisting of 47.66 grams of EBPA-DN and 0.0392 grams of BHT. The components were mixed together for an additional 1–2 hours. The whole process was carried out excluding actinic radiation and under a nitrogen atmosphere.

EXAMPLE 3

Thiol-nene Formulation 3 was prepared by mixing 17.34 grams PETMP and 1.30 grams of Darocur 1173 for thirty minutes. Then 47.68 grams of a premix consisting of 47.66 grams of EBPA-DN and 0.0221 grams of 4-methoxy phenol (MEHQ) was added and the components were mixed together for an additional 1–2 hours. The whole process was carried out excluding actinic radiation and under a nitrogen atmosphere.

EXAMPLE 4

Thiol-nene Formulation 4 was prepared by mixing 0.2388 grams 2-propenylphenol in 1.30 grams Darocur 1173. Next 17.34 grams of PETMP was added and mixed for 30 to 60 minutes. Then 47.66 grams of EBPA-DN was added and mixed for an additional 1 to 2 hours. The whole process was carried out excluding actinic radiation and under a nitrogen atmosphere.

EXAMPLE 5

Thiol-nene Formulation 5 was prepared by mixing 0.0260 grams Q1301 in 1.30 grams of Darocur 1173 until all the solids were completely dissolved. Then 17.34 grams of PETMP was added and mixed for 30 to 60 minutes. Next 47.70 grams of a premix consisting of 47.66 grams of EBPA-DN and 0.0392 grams of BHT was added and the components mixed together for an additional 1–2 hours. The whole process was carried out excluding actinic radiation and under a nitrogen atmosphere.

EXAMPLE 6

Thiol-nene Formulation 6 was prepared by mixing 0.0260 grams of Q1301 in 1.30 grams of Darocur 1173 until all the solids were completely dissolved. Next 17.34 grams of PETMP was added and mixed for 30 to 60 minutes. Then 47.68 grams of a premix consisting of 47.66 grams of EBPA-DN and 0.0221 grams of MEHQ was added and all the components mixed together for an additional 1–2 hours. The whole process was carried out excluding actinic radiation and under a nitrogen atmosphere.

EXAMPLE 7

Thiol-nene Formulation 7 was prepared by mixing 0.2388 grams of 2-propenylphenol, in 1.30 grams of Darocur 1173. Next 17.387 grams of a premix consisting of 17.34 grams PETMP and 0.0260 grams Q1301 was added and the components mixed together until all the solids were completely dissolved. Then 47.66 grams of EBPA-DN was added and the formulation was mixed for an additional 1–2 hours. The whole process was carried out excluding actinic radiation and under a nitrogen atmosphere.

EXAMPLE 8

Thiol-nene Formulation 8 was prepared by mixing 0.2388 grams 2-propenylphenol and 0.0392 grams BHT in 1.30 grams Darocur 1173 until all the solids were completely dissolved. Next 17.34 grams of PETMP was added and mixed for 30 to 60 minutes. Then 47.66 grams of EDPA-DN was added and the formulation mixed for an additional 1 to 2 hours. The whole process was carried out excluding actinic radiation and under a nitrogen atmosphere.

EXAMPLE 9

Thiol-nene Formulation 9 was prepared by mixing 0.2388 grams 2-propenylphenol in 1.30 grams Darocur 1173. Next 17.34 grams of PETMP was added and mixed for 30 to 60 minutes. Then 47.68 grams of a premix consisting of 47.66 grams of EBPA-DN and 0.0221 grams MEHQ was added and mixed together for 1–2 hours. The whole process was carried out excluding actinic radiation and under a nitrogen atmosphere.

EXAMPLE 10

Thiol-nene Formulation 10 was prepared by mixing 0.0260 grams of Q1301 and 17.34 grams PETMP until all of the solid is completely dissolved. Then 1.58 grams of a premix consisting of 1.30 grams of Darocur 1173 and 0.0392 grams of DHT and 0.2388 grams 2-propenylphenol was added and mixed for an additional 30 to 60 minutes. Then 47.66 grams of EDPA-DN was added and the formulation mixed for an additional 1 to 2 hours. The whole process was carried out excluding actinic radiation and under a nitrogen atmosphere.

EXAMPLE 11

Thiol-nene Formulation 11 was prepared by mixing 0.0260 grams Q1301 and 17.34 grams PETMP until all of the solid was dissolved. Next 1.56 grams of a premix consisting of 1.30 grams Darocur 1173, 0.0221 grams MEHQ and 0.2388 grams propenylphenol was added and mixed for an additional 30 to 60 minutes. Then 47.66 grams of EBPA-DN was added and all the components mixed for an additional 1 to 2 hours. The whole process was carried out excluding actinic radiation and under a nitrogen atmosphere.

EXAMPLE 12

Thiol-nene Formulation 12 was prepared by mixing 0.0260 grams Q1301 and 17.34 grams PETMP until all of the solid is completely dissolved. Next 1.60 grams of a premix consisting of 1.30 grams Darocur 1173, 0.0392 grams BHT, 0.0221 grams MEHQ and 0.2388 grams 2-propenylphenol, was added and mixed for an additional 30 to 60 minutes. Then 47.66 grams of EBPA-DN was added and all the components mixed for an additional 1–2 hours. The whole process was carried out excluding actinic radiation and under a nitrogen atmosphere.

Formulations 1–12 were tested to determine their stability and fixture speed. The results are shown in Table 1 below and FIG. 1.

TABLE 1

EXAMPLES 1-12

| | 1 | 2 | 3 | 4 | 5 | 6 | 7 | 8 | 9 | 10 | 11 | 12 |
|---|---|---|---|---|---|---|---|---|---|---|---|---|
| LEVELS | | | | | | | | | | | | |
| EBPA-DN | 47.66 | 47.66 | 47.66 | 47.66 | 47.66 | 47.66 | 47.66 | 47.66 | 47.66 | 47.66 | 47.66 | 47.66 |
| PETMP | 17.34 | 17.34 | 17.34 | 17.34 | 17.34 | 17.34 | 17.34 | 17.34 | 17.34 | 17.34 | 17.34 | 17.34 |
| Darocur 1173 | 1.30 | 1.30 | 1.30 | 1.30 | 1.30 | 1.30 | 1.30 | 1.30 | 1.30 | 1.30 | 1.30 | 1.30 |
| Q1301 | 0.0260 | — | — | — | 0.0260 | 0.0260 | 0.0260 | — | — | — | — | — |
| BHT | — | 0.0392 | — | — | 0.0392 | — | — | 0.0392 | — | 0.0392 | — | 0.0392 |
| MEHQ | — | — | 0.0221 | — | — | 0.0221 | — | — | 0.0221 | — | 0.0221 | 0.0221 |
| 2-PROPENYLPHENOL | — | — | — | 0.2388 | — | — | 0.2388 | 0.2388 | 0.2388 | 0.2388 | 0.2388 | 0.2388 |
| STABILITY DATA | | | | | | | | | | | | |
| EBPA-DN | Eq. | Eq. | Eq. | Eq. | Eq. | Eq. | Eq. | Eq. | Eq. | Eq. | Eq. | Eq. |
| PETMP | Eq. | Eq. | Eq. | Eq. | Eq. | Eq. | Eq. | Eq. | Eq. | Eq. | Eq. | Eq. |
| Darocur 1173 | 1.96% | 1.96% | 1.96% | 1.95% | 1.96% | 1.96% | 1.95% | 1.96% | 1.95% | 1.95% | 1.95% | 1.95% |
| Q1301 | 392 ppm | — | — | — | 392 ppm | 392 ppm | 391 ppm | — | — | 390 ppm | 390 ppm | 390 ppm |
| BHT | — | 591 ppm | — | — | 591 ppm | — | — | 589 ppm | — | 589 ppm | — | 588 ppm |
| MEHQ | — | — | 333 ppm | — | — | 333 ppm | — | — | 332 ppm | — | 332 ppm | 332 ppm |
| 2-PROPENYLPHENOL | — | — | — | 3,589 ppm | — | — | 3,587 ppm | 3,587 ppm | 3,588 ppm | 3,585 ppm | 3,589 ppm | 3,584 ppm |
| STARTING VISCOSITY, 0-TIME, cps | 7,421 | 9,200 | 7,715 | 7,420 | 7,840 | 6,794 | 8,150 | 7,382 | 6,880 | 9,300 | 7,323 | 7,049 |
| AGED VISCOSITY, 7 DAYS @ RT, cps | 11,552 | 12,844 | 14,980 | 11,880 | 8,302 | 9,920 | 6,960 | 7,245 | 8,067 | 7,020 | 7,049 | 6,892 |
| AGED VISCOSITY, 7 DAYS @ 49° C., cps | 61,620 | >800,000 | >800,000 | 28,400 | 38,400 | 31,249 | 10,040 | 10,025 | 6,970 | 10,180 | 8,987 | 9,673 |
| VISCOSITY GAIN AFTER 7 DAYS @ RT | 56% | 40% | 94% | 60% | 5.9% | 46% | −15% | −2% | 17% | −25% | −4% | −2% |
| VISCOSITY GAIN AFTER 7 DAYS @ 49° C. | 730% | >8,596% | >10,269% | 283% | 380% | 360% | +23% | 36% | +1% | 9% | 23% | 37% |
| UV CURE SPEED, FIXTURE TIME, 0.0015"-GAP, 10 mw/cm² | | | | | | | | | | | | |
| UV CURE, 0-TIME, 0.0015"-GAP, FIXTURE | 1.2 | 1.0 | 0.9 | 1.7 | 1.5 | 1.3 | 2.3 | 2.5 | 1.6 | 3.6 | 2.7 | 4.7 |

To determine stability, 15 to 20 grams of each of the thiol-nene formulations were poured out of the mixing container into 30 milliliter amber glass bottles equipped with a nitrogen blanket. They were then sealed and aged at room temperature and at 49° C. for seven days. Accelerated heat aging is used as a model for long-term storage. After seven days, the bottles were opened and viscosity measurements were done. The relative viscosity measurements were taken on a Brookfield HBTD or LVTDV viscometer (Brookfield Engineering Laboratories, Inc., Stoughton, Mass.) equipped with a small sample adapter using sample holder 13R and spindle 21 for high viscosity measurements (greater than 2500 cps) and spindle 18 for lower viscosity measurements (0 to 2500 cps).

Fixture speed was determined using an Oriel Model 87331 six inch collimated UV source equipped with a 500 watt super high pressure Hg lamp (Oriel Corp., Stratfford, Conn.). Output was adjusted and calibrated to 10 mw/cm2 using an International Light Model IL700 radiometer (International Light, Newburyport, Mass.). Fixture samples were prepared by placing a small amount of formulation between two precleaned, plain glass microscope slides (75 mm×25 mm×1 mm) with an overlap of 15 mm×25 mm with 0.0015" gap. Then the fixture sample assembly was exposed to UV light for 0.1–200 seconds. The overflow of the formulation on all four sides is carefully removed after UV light exposure. The UV exposed sample is then attached to a fixed stand at one end and a one Kilogram weight is suspended from the other end for sixty seconds. The sample is then measured to determine if the slides have moved. The sample is considered fixtured if the slides have moved less than one millimeter. Several samples are tested at 0.1 second intervals up to 10 seconds and at 1 second intervals up to 200 seconds until the fixture time is determined.

As can be seen from Table 1 above and FIG. 1, the use of a single component stabilizer system such as in Formulations 1–4, after aging at 7 days at 49° C., does not provide a long-term shelf stable product. For instance, Formulation 1 using only Q1301 exhibits a viscosity increase of 730%, Formulation 2 employing BHT exhibits a viscosity increase of greater than 8,596%, Formulation 3 employing MEHQ exhibits a viscosity increase of greater than 10,269% and Formulation 4 employing 2-propenylphenol exhibits a viscosity increase of 283%. Formulation 4, while it does have an improved stability as compared to the other single component systems, still does not provide the desired long-term shelf stability. The viscosity measurements of Formulations 5–6 as compared to 7–12 illustrate that a stabilizer system comprising at least two components with one component being an alkenyl substituted phenolic compound of Formulas 1 and 2, provides a formulation having long-term shelf stability. Formulations 5 and 6, employing Q1301/BHT and Q1301/MEHQ, respectively, still exhibit a viscosity increase of greater than 300% at 7 days at 49° C. In contrast, Formulations 7–12 employing the inventive compositions (i.e., 2-propenylphenol in combination with one or more free radical scavengers, hindered phenolic antioxidants and hydroxylamine derivatives) have comparatively negligible viscosity increases ranging from only 1% to 37% after 7 days at 49° C.

PREMIX 1: Premix 1 was made by adding 439.9 grams of ethoxylated bisphenol A di(norborn-2-ene-5-carboxylate) (EBPA-DN) and 3.62 grams 2,6-di-tert-butyl-4-methylphenol (BHT) to a 500 milliliter amber glass bottle equipped with a mechanical stirrer and nitrogen purge. The components are mixed vigorously together while being heated in a water bath to 49° C. The mixture is mixed for an additional 2 hours or until all of BHT has completely dissolved. The whole process was carried out and under an nitrogen atmosphere.

PREMIX 2: Premix 2 was made by adding 475.48 grams of ethoxylated bisphenol A di(norborn-2-ene-5-carboxylate) (EBPA-DN) and 2.2044 grams p-methoxy phenol (MEHQ) to a 500 milliliter amber glass bottle equipped with a mechanical stirrer and nitrogen purge. The components are mixed together for 5 hours or until all of the MEHQ has completely dissolved. The whole process was carried out under a nitrogen atmosphere.

PREMIX 3: Premix 3 was made by adding 439.90 grams of ethoxylated bisphenol A di(norborn-2-ene-5-carboxylate) (EBPA-DN) and 2.2044 grams 2-propenylphenol (2-PP) to a 500 milliliter amber glass bottle equipped with a mechanical stirrer and nitrogen purge. The components are mixed together for 2 hours or until all of the 2-PP has completely dissolved. The whole process was carried out under a nitrogen atmosphere.

EXAMPLE 13

Thiol-nene Formulation 13 was prepared by mixing 32.02 grams PETMP and 2.40 grams Darocur 1173 for thirty minutes. Next 88.71 grams of PREMIX 1 was added and the components mixed together for 1–2 hours. The process was carried out excluding actinic radiation and under a nitrogen atmosphere.

EXAMPLE 14

Thiol-nene Formulation 14 was made by mixing 32.02 grams PETMP and 2.40 grams Darocur 1173 for thirty minutes. Next 88.39 grams of premix 2 was added and the components mixed together for 1–2 hours. The whole process was carried out excluding actinic radiation and under a nitrogen atmosphere.

EXAMPLE 15

Thiol-nene Formulation 15 was made by mixing 32.02 grams of PETMP and 2.40 grams of Darocur 1173. Next 44.35 grams of PREMIX 1 and 44.21 grams of PREMIX 3 were added and the components mixed for an additional 1 to 2 hours. The whole process was carried out excluding actinic radiation and under a nitrogen atmosphere.

EXAMPLE 16

Thiol-nene Formulation 16 was made by mixing 32.02 grams of PETMP and 2.40 grams Darocur 1173. Next 44.1g grams of PREMIX 2 and 44.21 grams of PREMIX 3 were added and the components mixed for 1–2 hours. The whole process was carried out excluding actinic radiation and under a nitrogen atmosphere.

EXAMPLE 17

Thiol-nene Formulation 17 was prepared by mixing 0.0480 grams Q1301 and 2.40 grams Darocur 1173 until all the solids were completely dissolved. Next 32.02 grams of PETMP was added and mixed for 30 to 60 minutes. Then 44.35 grams of PREMIX 1 and 44.21 grams of PREMIX 3 were added and then mixed for an additional 1–2 hours. The whole process was carried out excluding actinic radiation and under a nitrogen atmosphere.

EXAMPLE 18

Thiol-nene Formulation 18 was made by mixing 0.0480 grams of Q1301 in 2.40 grams of Darocur 1173 until all the solids were completely dissolved. Next 32.02 grams of PETMP was added and mixed for 30 to 60 minutes. Then 44.1g grams of PREMIX 2 and 44.21 grams of PREMIX 3 were added and then mixed for an additional 1–2 hours. The whole process was carried out excluding actinic radiation and under a nitrogen atmosphere.

EXAMPLE 19

Thiol-nene Formulation 19 was prepared by mixing 0.0480 grams Q1301 in 2.40 grams Darocur 1173 until all the solids were completely dissolved. 32.02 grams of PETMP was added and mixed for 30 to 60 minutes. Then 29.46 grams of PREMIX 2, 29.47 grams of PREMIX 3 and 29.57 grams of PREMIX 1 were added and the entire mixture stirred for an additional 1–2 hours. The whole process was carried out excluding light and under a nitrogen atmosphere.

Formulations 13–19 were tested to determine their stability and fixture speed using the same instruments and techniques described above. The results are reported in Table 2 below and in FIG. 2.

tions 13, 14 and 4 employ a one-component stabilizer, whereas Formulations 15 and 16 employ a two-component stabilizer system of the present invention. As can be seen the two component system provides a marked improvement in stability.

Formulations 17 and 18 illustrate the use of a three-component stabilizer system of the present invention. Formulations 17 and 18 show a further increase in stability as compared to the two component systems of Formulations 15 and 16. Further, Formulation 19 illustrates the use of a four-component stabilizer system of the present invention. Formulation 19 has the same equivalent weight amount of stabilizer as Formulations 17 and 18 do. Again, as shown, Formulation 19 is more stable than Formulations 15 and 16 and about as stable as Formulations 17 and 18.

Generally Table 2 and FIG. 2 illustrate the variation in stability and cure speed that can be attained by using different combinations of stabilizing components. Such variation can be regulated depending on the number and amount of components used. Thus, one can tailor a specific stabilizer package for a specific thiol-ene or thiol-nene system for a givern application.

TABLE 2

EXAMPLES 13–19 & 4

| | 13 | 14 | 4 | 15 | 16 | 17 | 18 | 19 |
|---|---|---|---|---|---|---|---|---|
| EBPA-DN | 87.99 | 87.98 | 47.66 | 87.98 | 87.98 | 87.98 | 87.98 | 87.98 |
| PETMP | 32.02 | 32.02 | 17.34 | 32.02 | 32.02 | 32.02 | 32.02 | 32.02 |
| Darocur 1173 | 2.40 | 2.40 | 1.30 | 2.40 | 2.40 | 2.40 | 2.40 | 2.40 |
| Q1301 | — | — | — | — | — | 0.0480 | 0.0480 | 0.0480 |
| BHT | 0.7240 | — | — | 0.3620 | — | 0.3620 | — | 0.2413 |
| MEHQ | — | 0.4079 | — | — | 0.2039 | — | 0.2039 | 0.1360 |
| 2-PROPENYLPHENOL | — | — | 0.2388 | 0.2204 | 0.2204 | 0.2204 | 0.2204 | 0.1470 |
| LEVELS | | | | | | | | |
| EBPA-DN | Eq. | Eq. | Eq. | Eq. | Eq. | Eq. | Eq. | Eq. |
| PETMP | Eq. | Eq. | Eq. | Eq. | Eq. | Eq. | Eq. | Eq. |
| Darocur 1173 | 1.95% | 1.95% | 1.95% | 1.95% | 1.95% | 1.95% | 1.95% | 1.95% |
| Q1301 | — | — | — | — | — | 390 ppm | 391 ppm | 390 ppm |
| BHT | 5,880 ppm | — | — | 2,944 ppm | — | 2,942 ppm | — | 1.962 ppm |
| MEHQ | — | 3,321 ppm | — | — | 1,660 ppm | — | 1,659 ppm | 1,106 ppm |
| 2-PROPENYLPHENOL | — | — | 3,589 ppm | 1,792 ppm | 1,794 ppm | 1,791 ppm | 1,794 ppm | 1,195 ppm |
| STABILITY DATA | | | | | | | | |
| STARTING VISCOSITY, 0-TIME, cps | 6,740 | 6,912 | 7,420 | 6,900 | 6,892 | 6,755 | 6,700 | 6,736 |
| AGED VISCOSITY, 7 DAYS @ RT, cps | 20,626 | 26,240 | 11,800 | 8,540 | 18,993 | 6,677 | 6,880 | 6,794 |
| AGED VISCOSITY, 7 DAYS @ 49° C., cps | 624,000 | 800,000 | 28,400 | 12,800 | 18,699 | 10,417 | 10,320 | 11,846 |
| VISCOSITY GAIN AFTER 7 DAYS @ RT | 206% | 280% | 60% | 24% | 175.6% | −1% | 3% | 1% |
| VISCOSITY GAIN AFTER 7 DAYS @ 49° C. | 8,158% | 11,475% | 283% | 86% | 171% | 54% | 54% | 76% |
| UV CURE SPEED, FIXTURE TIME, 0.0015"-GAP, 10 mw/cm2 | | | | | | | | |
| UV CURE, 0-TIME, 0.0015"-GAP, FIXTURE | 3.5 | 2.5 | 1.7 | 3.6 | 2.1 | 4.1 | 3.2 | 5.4 |

The viscosity measurements of Formulations 13–19 clearly show the surprising synergistic effect on stability that is obtained from employing the stabilizer system of the present invention. Formulations 13, 14, 4, 15 and 16 all employ the same equivalent amount of stabilizer; however, the stability of these formulations varies widely. Formula-

EXAMPLE 20

Thiol-nene Formulation 20 was prepared by mixing 0.0480 grams Q1301, 0.0408 grams MEHQ and 0.4409 grams 2-propenylphenol in 2.40 grams Darocur 1173 until all the solids were completely dissolved. Then 32.02 grams of PETMP was added and mixed for 30 to 60 minutes. Next 87.98 grams of EBPA-DN was added and the formulation was mixed for an additional 1–2 hours. The whole process was carried out excluding actinic radiation and under a nitrogen atmosphere.

EXAMPLE 21

Thiol-nene Formulation 21 was prepared by mixing 0.0480 grams Q1301, 0.0408 grams MEHQ and 0.5856 grams 2-ethoxy-5-(1-propenyl)phenol (2-EPP) in 2.40 grams Darocur 1173 until all the solids were completely dissolved. Next 32.02 grams of PETMP was added and mixed for 30 to 60 minutes. Then 87.98 grams of EBPA-DN was added and the formulation mixed for an additional 1 to 2 hours. The whole process was carried out excluding actinic radiation and under a nitrogen atmosphere.

EXAMPLE 22

Thiol-nene Formulation 22 was prepared by mixing 0.048 grams Q1301, 0.0408 grams MEHQ and 0.5329 grams 4-acetoxystyrene in 2.40 grams Darocur 1173 until all the solids were completely dissolved. Next 32.02 grams of PETMP was added and mixed for 30 to 60 minutes. Then 87.98 grams of EBPA-DN was added and the formulation was mixed for an additional 1 to 2 hours. The whole process was carried out excluding actinic radiation and under a nitrogen atmosphere.

EXAMPLE 23

Thiol-nene Formulation 23 was prepared by mixing 0.048 grams Q1301, 0.0408 grams MEHQ and 0.5395 grams isoeugenal in 2.40 grams Darocur 1173 until all the solids were completely dissolved. Next 32.09 grams of PETMP was added and mixed for 30 to 60 minutes. Then 87.10 grams of EBPA-DN was added and the formulation was mixed for an additional 1–2 hours. The whole process was carried out excluding actinic radiation and under a nitrogen atmosphere.

EXAMPLE 24

Thiol-nene Formulation 24 was prepared by mixing 0.048 grams Q1301, 0.0408 grams MEHQ and 0.4409 grams 2-allylphenol in 2.40 grams Darocur 1173 until all the solids were completely dissolved. Next 32.02 grams was added and mixed for 30 to 60 minutes. Then 87.98 grams of EBPA-DN was added and the formulation was mixed for an additional 1–2 hours. The whole process was carried out excluding actinic radiation and under a nitrogen atmosphere.

EXAMPLE 25

Thiol-nene Formulation 25 was prepared by mixing 0.0480 grams Q1301, 0.0408 grams MEHQ and 0.5067 grams diallyl bisphenol A in 2.40 grams of Darocur 1173 until all the solids were completely dissolved. Next 32.02 grams of PETMP was added and mixed for 30 to 60 minutes. Then 87.98 grams of EBPA-DN was added and the formulation was mixed for an additional 1–2 hours. The whole process was carried out excluding actinic radiation and under a nitrogen atmosphere.

Formulations 20–25 and Formulation 6 were tested to determine their stability and fixture speed using the same instruments and techniques described above. The results are reported in Table 3 below and FIG. 3.

TABLE 3

EXAMPLES #6, 20–25

| | EXAMPLE NUMBER | | | | | | |
|---|---|---|---|---|---|---|---|
| | 6 | 20 | 21 | 22 | 23 | 24 | 25 |
| EBPA-DN | 47.66 | 87.98 | 87.98 | 87.98 | 87.10 | 87.98 | 87.98 |
| PETMP | 17.34 | 32.02 | 32.02 | 32.02 | 32.09 | 32.02 | 32.02 |
| Darocur 1173 | 1.30 | 2.40 | 2.40 | 2.40 | 2.40 | 2.40 | 2.40 |
| Q1301 | 0.0260 | 0.0480 | 0.0480 | 0.0480 | 0.0480 | 0.0480 | 0.0480 |
| MEHQ | 0.0221 | 0.0408 | 0.0408 | 0.0408 | 0.0408 | 0.0408 | 0.0408 |
| 2-Propenylphenyl (2-PP) | — | 0.4409 | — | — | — | — | — |
| 2-Ethoxy-5-(1-propenyl) phenol (2-EPP) | — | — | 0.5856 | — | — | — | — |
| 4-Acetoxy styrene (4AS) | — | — | — | 0.5329 | — | — | — |
| Isoeugenol (IU) | — | — | — | — | 0.5395 | — | — |
| 2-Allylphenol | — | — | — | — | — | 0.4409 | — |
| Di Allyl Bis phenol A (Matrimid Part B) | — | — | — | — | — | — | 0.5067 |
| LEVELS | | | | | | | |
| EPA-DN | Eq. | Eq. | Eq. | Eq. | Eq. | Eq. | Eq. |
| PETMP | Eq. | Eq. | Eq. | Eq. | Eq. | Eq. | Eq. |
| Darocur 1173 | 1.96% | 1.95% | 1.95% | 1.95% | 1.97% | 1.95% | 1.95% |
| Q1301 | 392 | 390 | 390 | 390 | 393 | 390 | 389 |
| MEHQ | 333 | 332 | 332 | 332 | 334 | 332 | 330 |
| 2-Propenylphenol | — | 3587 | — | — | — | — | — |
| 2-Ethoxy-5-(1-propenyl) phenol (2-EPP) | — | — | 4758 | — | — | — | — |
| 4-Acetoxy styrene (SN 10282) | — | — | — | 4332 | — | — | — |
| Isoeugenol (IU) | — | — | — | — | 4414 | — | — |

TABLE 3-continued

EXAMPLES #6, 20–25

| | EXAMPLE NUMBER | | | | | | |
|---|---|---|---|---|---|---|---|
| | 6 | 20 | 21 | 22 | 23 | 24 | 25 |
| 2-Allylphenol | — | — | — | — | — | 3587 | — |
| Di Allyl Bis phenol A (Matrimid Part B) | — | — | — | — | — | — | 4103 |
| | STABILITY DATA | | | | | | |
| STARTING VISCOSITY, 0-TIME, cps | 6,794 | 6,840 cps | 6,720 | 6,736 cps | 6,840 | 6,900 | 7264 |
| AGED VISCOSITY, 7 DAYS @ RT, cps | 9.920 | 6,860 cps | 6,840 | 7,382 cps | 6,990 | 7,400 | 8028 |
| AGED VISCOSITY, 7 DAYS @ 49° C., cps | 31,249 | 9,040 cps | 11,660 cps | 10,554 cps | 11,102 | 15,200 | 34273 |
| VISCOSITY GAIN AFTER 7 DAYS @ RT | 46% | 0% | 2% | 10% | 5% | 7% | 115 |
| VISCOSITY GAIN AFTER 7 DAYS @ 49° C. | 360% | 32% | 74% | 57% | 67% | 120% | 372% |
| | UV CURE SPEED, FIXTURE TIME, 0.0015"-GAP, 10 mw/cm2 | | | | | | |
| UV CURE, 0-TIME, 0.0015"-GAP, FIXTURE | 1.3 | 2.8 | 1.9 | 1.8 | 5.1 | 1.7 | 1.5 |

Formulations 21–25 illustrate other alkenyl substituted phenolics of the present invention such as 2-ethoxy-5-(1-propenyl)phenol, 4-acetoxystyrene, isoeugenol, 2-allylphenol and diallyl bisphenol A in a stabilizer system along with Q1301 and MEHQ. Formulations 21–24 are more stable than Formulation 6 which comprises only Q 1301 and MEHQ.

EXAMPLE 26

Thiol-ene Formulation 26 was prepared by mixing 0.0408 grams MEHQ in 2.40 grams of Darocur 1173 until all the solids were completely dissolved. Next 64.27 grams of PETMP was added and mixed for 30 to 60 minutes. Then 55.70 grams of 3,9-divinyl-2,4,8,10-tetraoxaspiro [5,5]undecane (DIV) was added and mixed for 1 to 2 hours. The whole process was carried out excluding actinic radiation and under a nitrogen atmosphere.

EXAMPLE 27

Thiol-ene Formulation 27 was prepared by mixing 0.0408 grams MEHQ, 0.0480 grams Q1301 and 0.4409 grams 2-propenylphenol in 2.40 grams Darocur 1173 until all the solids were completely dissolved. Next 64.27 grams PETMP was added and mixed for 30 to 60 minutes. Then 55.70 grams of DIV was added and the formulation mixed for 1–2 hours. The whole process was carried out excluding actinic radiation and under a nitrogen atmosphere.

EXAMPLE 28

Thiol-ene Formulation 28 was prepared by mixing 0.0408 grams MEHQ, 0.0480 grams Q1301 and 0.5066 grams di allyl bis phenol A (DABPA) in 2.40 grams Darocur 1173 until all the solids were completely dissolved. Next 64.27 grams of PETMP was added and mixed for an additional 30 to 60 minutes. Then 55.70 grams of DIV was added and mixed for 1 to 2 hours. The whole process was carried out excluding actinic radiation and under a nitrogen atmosphere.

EXAMPLE 29

Thiol-ene Formulation 29 was prepared by mixing 0.0408 grams MEHQ in 2.40 grams Darocur 1173 until all the solids were completely dissolved. Next 71.47 grams of PETMP was added and mixed for 30 to 60 minutes. Then 48.48 grams of triallyl-1,3,5-triazine-2,4,6-(1H,3H,5H)-trione (TATT) containing 0.0243 grams t-butyl hydroquinone was added and mixed for 1–2 hours. The whole process was carried out excluding actinic radiation and under a nitrogen atmosphere.

EXAMPLE 30

Thiol-ene Formulation 30 was made by mixing 0.0408 grams MEHQ, 0.0480 grams Q1301 and 0.4409 grams 2-propenylphenol in 2.40 grams Darocur 1173 until all the solids were completely dissolved. Next 71.47 grams of PETMP was added and mixed for 30 to 60 minutes. Then 48.48 grams of TATT containing 0.0243 grams t-butyl hydroquinone was added and mixed for 1–2 hours. The whole process was carried out excluding actinic radiation and under a nitrogen atmosphere.

EXAMPLE 31

Thiol-ene Formulation 31 was prepared by mixing 0.0408 grams MEHQ, 0.0480 grams Q1301 and 0.5066 grams diallyl bisphenol A (DABPA) in 2.40 grams of Darocur 1173 until all the solids were completely dissolved. Next 71.47 grams of PETMP was added and mixed for 30 to 60 minutes. Then 48.48 grams of TATT containing 0.0243 grams t-butyl hydroquinone was added and mixed for 1 to 2 hours. The whole process was carried out excluding actinic radiation and under a nitrogen atmosphere.

Formulations 26–31 were tested to determine their stability and fixture speed using the same instruments and techniques described above. The results are reported in Table 4 below and FIG. 4.

TABLE 4

EXAMPLES 26–31

| | EXAMPLE NUMBER | | | | | |
|---|---|---|---|---|---|---|
| | 26 | 27 | 28 | 29 | 30 | 31 |
| 3,9-Divinyl-2,4,8,10-tetraoxaspiro[5.5]undecar | 55.70 | 55.70 | 55.70 | — | — | — |
| Triallyl-1,3,5-triazine-2,4,6(1H,3H,5H)-trione | — | — | — | 48.48 | 48.48 | 48.48 |

TABLE 4-continued

EXAMPLES 26–31

| | EXAMPLE NUMBER | | | | | |
|---|---|---|---|---|---|---|
| | 26 | 27 | 28 | 29 | 30 | 31 |
| PETMP | 64.27 | 64.27 | 64.27 | 71.47 | 71.47 | 71.47 |
| Darocur 1173 | 2.40 | 2.40 | 2.40 | 2.40 | 2.40 | 2.04 |
| Q1301 | — | 0.0408 | 0.0480 | — | 0.0480 | 0.0480 |
| MEHQ | 0.0408 | 0.408 | 0.0408 | 0.0408 | 0.0408 | 0.0408 |
| t-Butyl hydroquinone | — | — | — | 0.0243 | 0.0243 | 0.0243 |
| 2-Propenylphenol | — | 0.4409 | — | — | 0.4409 | — |
| Di Allyl Bis phenol A (Matrimid Part B, B #410 | — | — | 0.5066 | — | — | 0.5066 |
| LEVELS | | | | | | |
| 3,9-Divinyl-2,4,8,10-tetraoxaspiro[5.5]undecar | Eq. | Eq. | Eq. | — | — | — |
| Triallyl-1,3,5-triazine-2,4,6(1H,3H,5H)-trione | — | — | — | Eq. | Eq. | Eq. |
| PETMP | Eq. | Eq. | Eq. | Eq. | Eq. | Eq. |
| Darocur 1173 | 1.96% | 1.95% | 1.95% | 1.96% | 1.96% | 1.96% |
| Q1301 | — | 391 | 390 | — | 391 | 390 |
| MEHQ | 333 | 332 | 332 | 333 | 332 | 332 |
| t-Butyl hydroquinone | — | — | — | 199 | 198 | 198 |
| 2-Propenylphenol | — | 3588 | — | — | 3587 | — |
| Di Allyl Bis phenol A (Matrimid Part B, B #410 | — | — | 4120 | — | — | 4120 |
| STABILITY DATA | | | | | | |
| STARTING VISCOSITY, 0-TIME, cps | 153 | 145 | 141 | 328 | 320 | 331 |
| AGED VISCOSITY, 7 DAYS @ RT, cps | 218 | 143 | 150 | 498 | 326 | 361 |
| AGED VISCOSITY, 7 DAYS @ 49° C., cps | 405 | 213 | 319 | 2,737 | 364 | 615 |
| VISCOSITY GAIN AFTER 7 DAYS @ RT | 42% | −2% | 6% | 52% | 2% | 9% |
| VISCOSITY GAIN AFTER 7 DAYS @ 49° C. | 164% | 46% | 126% | 735% | 14% | 86% |
| UV CURE SPEED, FIXTURE TIME, 0.0015"-GAP, 10 mw/cm2 | | | | | | |
| UV CURE, 0-TIME, 0.0015"-GAP, FIXTURE | 1.1 | 2.6 | 2.8 | 0.4 | 1.1 | 1.1 |

Formulations 26–31 illustrate two additional enes that may be used in the current invention, 3,9-divinyl-2,4,8,10-tetraoxaspiro-[5,5,] undecane (DIV-a vinyl functional ene) and triallyl-1,3,5-triazine-2,4,6(1H,3H,5H)-trione (TATT— an allylic functional ene) and another alkenylene substituted phenolic compound of Formula II, diallyl bisphenol A. Again, it can be seen that an alkenylene substituted phenolic compound of Formula 1 is a necessary component of the stabilizer system. Formulation 26 without the phenolic compound has a 7 day at 49° C. viscosity increase of 164%; whereas, Formulation 27 with the addition of Q1301 and 2-propenylphenol has only a 46% increase in viscosity after 7 days at 49° C. Similarly, Formulation 29 without the phenolic compound has a 7 day at 49° C. viscosity increase of 735%; whereas, Formulation 30 with the addition of Q1301 and 2-propenylphenol only has a 14% increase in viscosity under the same conditions.

EXAMPLE 32

Thiol-nene Formulation 32 was prepared by mixing 0.0650 grams Q1301 in 1.31 grams Darocur 1173 until all the solids were completely dissolved. Next 17.34 grams of PETMP was added and mixed for 30 to 60 minutes. Then 47.70 grams of EBPA-DN was added and the formulation was mixed for an additional 1–2 hours. The whole process was carried out excluding actinic radiation and under a nitrogen atmosphere.

EXAMPLE 33

Thiol-nene Formulation 33 was prepared by mixing 0.800 grams Q1301 and 3.225 grams 2-propenylphenol in 16.00 grams Darocur 1173 until all the solids were completely dissolved. Next 215.36 grams of PETMP was added and mixed for 30 to 60 minutes. Then 584.60 grams of EBPA-DN was added and the formulation was mixed for an additional 1–2 hours. The whole process was carried out excluding actinic radiation and under a nitrogen atmosphere.

EXAMPLE 34

Thiol-nene Formulation 34 was prepared by mixing 0.0130 grams Q1301, 0.0013 grams Q1300 (N-nitrosophenylhydroxylamine ammonium salt) and 0.5240 grams 2-propenylphenol in 2.60 grams Darocur 1173 until all the solids were completely dissolved. Next, 34.70 grams of PETMP was added and mixed for 30 to 60 minutes. Then 95.30 grams of EBPA-DN of added and the formulation was mixed for an additional 1–2 hours. The whole process was carried out excluding light and under a nitrogen atmosphere.

EXAMPLE 35

Thiol-nene Formulation 35 was prepared by mixing 0.0800 grams Q1301, 0.00800 grams Q1300, 3.225 grams 2-propenylphenol and 16.00 grams Darocur 1173 together until all the solids were completely dissolved. Next 215.36 grams of PETMP was added and mixed for 30 to 60 minutes. Then 584.60 grams of EBPA-DN was added and the formulation was mixed for an additional 1 to 2 hours. The whole process was carried out excluding actinic radiation and under a nitrogen atmosphere.

EXAMPLE 36

Thiol-nene Formulation 36 was prepared by mixing 0.0130 grams Q1301, 0.0013 grams Q1300 and 0.5240 grams 2-propenylphenol in 2.60 grams Darocur 1173 until all the solids completely dissolved. Next, 37.20 grams was added and mixed for 30 to 60 minutes. Then 92.80 grams of EBPA-DN was added and the entire formulation was mixed for an additional 1–2 hours. The whole process was carried out excluding light and under a nitrogen atmosphere.

EXAMPLE 37

Thiol-nene Formulation 37 was prepared by mixing 0.0408 grams MEHQ, 0.1200 grams Q1301, 0.4409 grams 2-propenylphenol and 2.40 grams Darocur 1173. Next 34.98 grams of trimethylolpropane tri-(3-mercaptopropionate) (TMP-TMP) was added and mixed for 30 to 60 minutes. Then 85.03 grams of EBPA-DN was added and mixed for 1 to 2 hours. The whole process was carried out excluding actinic radiation and under a nitrogen atmosphere.

EXAMPLE 38

First PREMIX 4 was made by charging 1,200 grams of EBPA-DN in a two liter three neck round bottom flask equipped with a water condenser, thermometer, nitrogen purge and a mechanical stirrer. The composition was heated up to 60° C. and then 1.65 milliliters of a 1 molar potassium iodide/1 molar iodine aqueous solution was added. Mixing was continued for 6 hours at 60° C.

Thiol-nene Formulation 38 was prepared by mixing 0.0160 grams Q1301 in 1.30 grams Darocur 1173 until all the solids were completely dissolved. Next, 17.50 grams of PETMP was added and mixed for 30 to 60 minutes. Then 47.50 grams of PREMIX 4 was added. The formulation was then mixed for an additional 1 to 2 hours. The whole process was carried out excluding light and under a nitrogen atmosphere.

EXAMPLE 39

Thiol-nene Formulation 39 was prepared by mixing 0.0160 grams Q1301 and 0.2620 grams 2-propenylphenol in 1.30 grams Darocur 1173 until all the solids were completely dissolved. Next 17.50 grams of PETMP was added and mixed for 30 to 60 minutes. Then 47.50 grams of PREMIX 4 of Example 38 was added and the formulation mixed for 1–2 hours. The whole process was carried out excluding actinic radiation and under a nitrogen atmosphere.

EXAMPLE 40

Thiol-nene Formulation 40 was prepared by mixing 0.2620 grams 2-propenyl phenol in 1.30 grams Darocur 1173. Next 17.50 grams of a premix consisting of 0.0065 grams N,N-diethylhydroxylamine and 17.4 g grams PETMP was added and mixed for 30 to 60 minutes. Then 47.50 grams of PREMIX 4 of Example 38 was added to the formulation and mixed for an additional 1–2 hours. The whole process was carried out excluding actinic radiation and under a nitrogen atmosphere.

Formulations 32–40 were tested to determine their stability and fixture speed using the same instruments and techniques described above. The results are reported in Table 5 below and FIG. 5.

TABLE 5

EXAMPLES 32–41

| | EXAMPLE NUMBER | | | | | | | | |
|---|---|---|---|---|---|---|---|---|---|
| | 32 | 33 | 34 | 35 | 36 | 37 | 38 | 39 | 40 |
| EBPA-DN | 47.70 | 584.60 | 95.30 | 584.60 | 92.80 | 85.03 | 47.47 | 47.47 | 47.47 |
| PETMP | 17.34 | 215.36 | 34.70 | 215.36 | 37.20 | — | 17.50 | 17.50 | 17.49 |
| TMP-TMP | — | — | — | — | — | 34.98 | — | — | — |
| Darocur 1173 | 1.31 | 16.00 | 2.60 | 16.00 | 2.60 | 2.40 | 1.30 | 1.30 | 1.30 |
| Q1301 | 0.0650 | 0.8000 | 0.0130 | 0.0800 | 0.0130 | 0.1200 | 0.0160 | 0.0160 | — |
| Q1300 | — | — | 0.0013 | 0.00800 | 0.0013 | — | — | — | — |
| N,N-Diethylhydroxylamine | — | — | — | — | — | — | — | — | 0.0065 |
| Potassium iodide | — | — | — | — | — | — | 0.0130 | 0.0130 | 0.0130 |
| Iodine | — | — | — | — | — | — | 0.0199 | 0.0199 | 0.0199 |
| MEHQ | — | — | — | — | — | 0.0408 | — | — | — |
| 2-PROPENYLPHENOL | — | 3.225 | 0.5240 | 3.225 | 0.540 | 0.4409 | — | 0.2620 | 0.260 |
| LEVELS | | | | | | | | | |
| PETMP/NORBORNENE EQUIVALENCE RATIO | 1/1 | 1/1 | 9/1 | 1/1 | 1/1.1 | — | 1/1 | 1/1 | 1/1 |
| TMP-TMP/NORBORNENE EQUIVALENCE RATIO | — | — | — | — | — | 1/1 | — | — | — |
| Darocur 1173 | 197% | 1.95% | 1.96% | 1.95% | 1.96% | 1.95% | 1.96% | 1.96% | 1.95% |
| Q1301 | 979 | 976 | 98 | 98 | 98 | 976 | 241 | 240 | — |
| Q1300 | — | — | 10 | 10 | 10 | — | — | — | — |
| N,N-Diethylhydroxylamine | — | — | — | — | — | — | — | — | 98 |
| Potassium iodide | — | — | — | — | — | — | 195 | 195 | 195 |
| Iodine | — | — | — | — | — | — | 299 | 299 | 299 |
| NEHQ | — | — | — | — | — | 332 | — | — | — |
| 2-PROPENYLPHENOL | — | 3,933 | 3,936 | 3,936 | 3,936 | 3,584 | — | 3,936 | 3,937 |
| STABILITY DATA | | | | | | | | | |
| STARTING VISCOSITY, 0-TIME, cps | 7,140 | 7,035 | 8,341 | 7,174 | 6,840 | 3,460 | 7,120 | 6,560 | 5,991 |
| AGED VISCOSITY, 7 DAYS @ RT, cps | 11,780 | 7,666 | 8,322 | 7,084 | 6,700 | 3,440 | N/A | N/A | N/A |
| AGED VISCOSITY, 7 DAYS @ 49° C., cps | 16,000 | 9,070 | 8,498 | 8,645 | 7,580 | 4,420 | 8,780 | 7,260 | 6,726 |
| VISCOSITY GAIN AFTER 7 DAYS @ RT | 65% | 9% | 0% | –1% | –2% | –1% | — | — | — |
| VISCOSITY GAIN AFTER 7 DAYS @ 49° C. | 124% | 29% | 2% | 21% | 11% | 28% | 23% | 11% | 12% |
| UV CURE SPEED, FIXTURE TIME, 0.0015"-GAP, 10 mw/cm2 | | | | | | | | | |
| UV CURE, 0-TIME, 0.0015"-GAP, FIXTURE | 1.3 | 3.2 | 2.2 | 2.0 | 2.0 | 8.7 | 2.7 | 4.9 | 7.8 |

Comparing the stability data for Formulations 33 and 35 illustrates that the total amount of stabilizer employed can be reduced by adding another component to the stabilizer system. The stability of Formulations 34, 35 and 36 illustrate that the thiol to nene equivalence ratio has little effect on room temperature stability or fixture speed. Formulation 34 has a 0.9:1 thiol to nene ratio, Formulation 35 a 1:1 ratio, and Formulation 36 a 1.1:1 ratio. Formulation 37 illustrates the use of a different thiol of the present invention, namely TMP-TMP. Formulations 38 and 39 illustrate the stabilizer system of the present invention in a triodide system of U.S. Pat. No. 5,208,281. Formulation 40 illustrates the use of a different hydroxylamine compound of the present invention N,N-Diethylhydroxylamine.

The compositions of the present invention with increased long-term stability will be useful for a myriad of applications in fields like UV curable adhesives and coatings, fiber optic coatings, stereolithography, polymer dispersed liquid crystals and in any applications where stable resins are needed.

Obviously, other modifications and variations to the present invention are possible and may be apparent to those skilled in the art in light of the above teachings. Thus, it is to be understood that such modifications and variations to the specific embodiments set forth above are to be construed as being within the full intended scope of the present invention as defined by the appended claims.

We claim:

1. A thiol-ene composition comprising a polythiol, a polyene and from about 260 to 40,500 ppm of a stabilizer system comprising an alkenyl substituted phenolic compound having a formula:

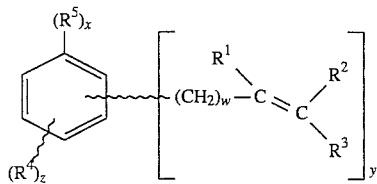

wherein $R^1$, $R^2$ and $R^3$ are independently selected from the group consisting of H, OR, a $C_1$–$C_8$ alkyl, substituted alkyl, alkenyl or substituted alkenyl, a $C_6$–$C_{20}$ aryl or substituted aryl, or a cyano group;

$R^4$ is H, R, OR, halogen, COR, COOR, or SR;

$R^5$ is OH, OR, OCOR, OCOOR, OCONHR, or trimethylsilyloxy;

R is a $C_1$–$C_6$ alkyl, a cycloalkyl, or a $C_6$–$C_{20}$ aryl or substituted aryl;

x and y are 1, 2 or 3;

z is 0, 1, or 2;

x+y+z=2, 3 or 4; and w is 0 or 1;

or a formula:

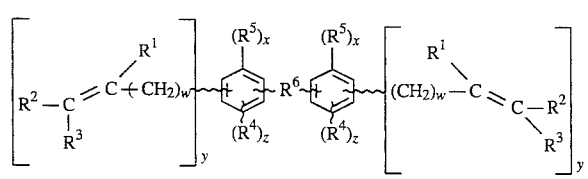

where x, y, z, w, $R^1$, $R^2$, $R^3$, $R^4$ and $R^5$ are defined as above, except that x+y+z=2–6, and $R^6$ is $CH_2$, $C(CH_3)_2$, O, S. Or $SO_2$;

and one or more compounds selected from the group consisting of a quinone free radical scavenger, a hindered phenolic antioxidant and a hydroxylmine, wherein the alkenyl substituted phenolic compound, the quinone free radical scavenger, the hindered phenolic antioxidant and the hydroxylamine are specifically excluded from the definition of the polyene component:

wherein the terms substituted alkyl, substituted alkenyl and substituted aryl refers to an alkyl, alkenyl or aryl group, respectively, that is substituted with at least one halogen atom or oxygen atom or to an alkyl, alkenyl or aryl group having an ether oxygen atom.

2. The composition of claim 1 wherein the stabilizer system comprises from about 200 to 15,000 ppm of an alkenyl substituted phenolic compound and from about 50 to 10,000 ppm of a quinone free radical scavenger.

3. The composition of claim 1 wherein the stabilizer system comprises from about 200 to 15,000 ppm of an alkenyl substituted phenolic compound and from about 50 to 10,000 ppm of a hindered phenolic antioxidant.

4. The composition of claim 1 wherein the stabilizer system comprises from about 200 to 15,000 ppm of an alkenyl substituted phenolic compound and from about 10 to 5000 ppm of a hydroxylamine.

5. The composition of claim 1 wherein the stabilizer system comprises from about 200 to 15,000 ppm of an alkenyl substituted phenolic compound, from about 50 to 10,000 ppm of a quinone free radical scavenger and from about 50 to 10,000 ppm of a hindered phenolic antioxidant.

6. The composition of claim 1 wherein the stabilizer system comprises from about 200 to 15,000 ppm of an alkenyl substituted phenolic compound, from about 50 to 10,000 ppm of a hindered phenolic antioxidant and from about 10 to 5000 ppm of a hydroxylamine.

7. The composition of claim 1 wherein the stabilizer system comprises from about 200 to 15,000 ppm of an alkenyl substituted phenolic compound, from about 50 to 10,000 ppm of a quinone free radical scavenger and between about 10 to 5000 ppm of a hydroxylamine.

8. The composition of claim 1 wherein the stabilizer system comprises from about 200 to 15,000 ppm of an alkenyl substituted phenolic compound, from about 50 to 10,000 ppm of a quinone free radical scavenger, from about 50 to 10,000 ppm of a hindered phenolic antioxidant and from about 10 to 5000 ppm of a hydroxylamine.

9. The composition of claim 1 wherein the alkenyl substituted phenolic compound comprises from about 500 to 7,000 ppm and is selected from the group consisting of 2-propenylphenol, 4-acetoxystyrene, 2-ethoxy-5-(1-propenyl)phenol, diallyl bisphenol A and isoeugenol.

10. The composition of claim 1 wherein the alkenyl substituted phenolic compound is 2-propenylphenol.

11. The composition of claim 1 wherein the quinone free radical scavenger comprises from about 100 to 1,000 ppm and is selected from the group consisting of 4-methoxyphenol and hydroquinone.

12. The composition of claim 1 wherein the quinone free radical scavenger comprises from about 100 to 1,000 ppm and is selected from the group consisting of 4-methoxyphenol and hydroquinone.

13. The composition of claim 1 wherein the hindered phenolic antioxidant comprises from about 100 to 1,000 ppm and is selected from the group consisting of 2,6-di-tert-butyl-4-methylphenol and butylated hydroxy anisole.

14. The composition of claim 1 wherein the hindered phenolic antioxidant is 2,6-di-tert-butyl-4-methylphenol.

15. The composition of claim 1 wherein the hydroxylamine comprises from about 25 to 1,000 ppm and is selected from the group consisting of N,N-diethylhydroxylamine, N-Nitrosophenylhydroxylamine aluminum salt and N-Nitrosophenylhydroxylamine ammonium salt.

16. The composition of claim 1 wherein the hydroxylamine is N-Nitrosophenylhydroxylamine aluminum salt.

17. The composition of claim 1 wherein the hydroxylamine is a mixture of N-Nitrosophenylhydroxylamine ammonium salt.

18. The composition of claim 1 wherein the hydroxylamine is selected from the group consisting of aryl hydroxylamines, aryl alkyl hydroxylamines, dialkylhydroxylamines, and cation salts of N-Nitrosoarylhydroxylamine.

19. A method for producing a stable thiol-ene composition comprising the steps of providing a polythiol and a polyene and adding thereto from about 260 to 40,500 ppm of a stabilizer system comprising an alkenyl substituted phenolic compound having a formula:

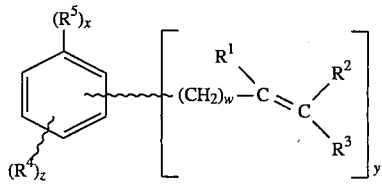

wherein $R^1$, $R^2$ and $R^3$ are independently selected from the group consisting of H, OR, a $C_1$–$C_8$ alkyl, substituted alkyl, alkenyl or substituted alkenyl, a $C_6$–$C_{20}$ aryl or substituted aryl, or a cyano group;

$R^4$ is H, R, OR, halogen, COR, COOR, or SR;

$R^5$ is OH, OR, OCOR, OCOOR, OCONHR, or trimethylsilyloxy;

R is a $C_1$–$C_6$ alkyl, a cycloalkyl, or a $C_6$–$C_{20}$ aryl or substituted aryl;

x and y are 1, 2 or 3;

z is 0, 1, or 2;

x+y+z=2, 3 or 4; and w is 0 or 1;

or a formula:

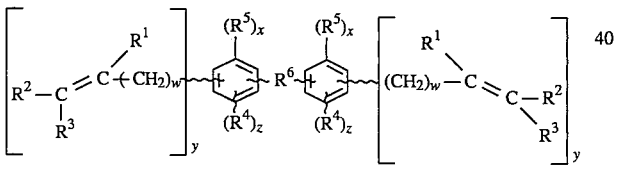

where x, y, z, w, $R^1$, $R^2$, $R^3$, $R^4$ and $R^5$ are defined as above, except that x+y+z=2–6, and $R^6$ is $CH_2$, $C(CH_3)_2$, O, S, or $SO_2$;

and one or more compounds selected from the group consisting of a quinone free radical scavenger, a hindered phenolic antioxidant and a hydroxylamine, wherein the alkenyl substituted phenolic compound, the quinone free radical scavenger, the hindered phenolic antioxidant and the hydroxylamine are specifically excluded from the definition of the polyene component:

wherein the terms substituted alkyl, substituted alkenyl and substituted aryl refers to an alkyl, alkenyl or aryl group, respectively, that is substituted with at least one halogen atom or oxygen atom or to an alkyl, alkenyl or aryl group having an ether oxygen atom.

20. The method of claim 19 wherein the alkenyl substituted phenolic compound comprises from about 200 to 15,000 ppm and is selected from the group consisting of 2-propenylphenol, 4-acetoxystyrene, 2-ethoxy-5-(1-propenyl)phenol, diallyl bisphenol A and isoeugenol.

21. The method of claim 19 wherein the quinone free radical scavenger comprises from about 50 to 10,000 ppm and is selected from the group consisting of 4-methoxyphenol and hydroquinone.

22. The method of claim 19 wherein the hindered phenolic antioxidant comprises from 50 to 10,000 and is selected from the group consisting of 2,6,-di-tert-butyl-4-methylphenol and butylated hydroxy anisole.

23. The method of claim 19 wherein the hydroxylamine comprises from about 10 to 5,000 ppm and is selected from the group consisting of N-Nitrosophenylhydroxylamine aluminum salt, N-Nitrosophenylhydroxylamine ammonium salt and N,N-diethylhydroxylamine.

* * * * *